Oct. 14, 1969 K. IRANI 3,472,073
LINEARIZED THERMOCOUPLE MEASURING CIRCUIT
Filed June 30, 1967 3 Sheets-Sheet 1

INVENTOR
KEIKHOSROW IRANI
BY
Rudolph␣␣␣␣␣
ATTORNEY

3,472,073
Patented Oct. 14, 1969

3,472,073
LINEARIZED THERMOCOUPLE MEASURING CIRCUIT
Keikhosrow Irani, Hackensack, N.J., assignor to Thermo Electric Co., Inc., Saddle Brook, N.J., a corporation of New Jersey
Filed June 30, 1967, Ser. No. 650,276
Int. Cl. G01k 5/18, 5/52, 7/00
U.S. Cl. 73—360                    9 Claims

ABSTRACT OF THE DISCLOSURE

A potentiometric circuit for measuring the voltage generated by a thermocouple. A pair of potentiometers, mounted on a common shaft, and a plurality of fixed resistors are connected to form an electrical network, the effective resistance of the network varying in correspondence with the non-linear voltage-temperature characteristic of the thermocouple connected thereto.

BACKGROUND OF THE INVENTION

The invention relates to temperature measuring and/or control apparatus having a thermocouple as the temperature sensing element.

The potentiometric method is an accurate and reliable means for measuring the voltage generated by a thermocouple. However, the voltage vs. temperature response of a thermocouple is non-linear over a wide temperature range, thereby requiring an analog interpretation of temperature by means of a non-uniformly calibrated scale. In order to provide a digital representation of temperature values, it is necessary to utilize a translating means capable of compensating for the non-linear response of the thermocouple. It has heretofore been the practice of providing such translating means in the form of potentiometers of special construction. In such potentiometers, the resistance winding is so arranged that its ohmic resistance, distributed from end to end, varies non-uniformly with equal, incremental displacements of the slider or movable contact arm. In this manner, the variable magnitudes of the thermocouple voltage are compensated for by correspondingly variable changes in the potentiometer resistance. However, the design and construction of such potentiometers is complex and expensive. Advantageously, the potentiometers utilized in a network made in accordance with this invention are of conventional construction.

SUMMARY OF THE INVENTION

The potentiometric measuring network comprises fixed resistors and a pair of simultaneously-adjustable potentiometers, said potentiometers having resistance windings uniformly distributed from end to end thereof. The network is interposed between the thermocouple and a constant voltage source and its effective network resistance, upon adjustment of the potentiometers, varies in correspondence with the non-linear response characteristic of the particular thermocouple, whereby a suitable read-out means may be coupled to the potentiometer shaft to provide a digital presentation of temperature values. The fixed resistors and the potentiometers are adjustable to precise ohmic values, thereby resulting in temperature measuring apparatus of high accuracy.

An object of this invention is the provision of a potentiometric circuit for measuring the voltage generated by a thermocouple, which circuit is adapted for use in apparatus providing a digital representation of temperature values.

An object of this invention is the provision of temperature measuring apparatus of the potentiometric class and having a thermocouple as the temperature sensing element, which apparatus includes a pair of simultaneously-adjustable potentiometers, of conventional construction, and fixed resistors connected to form a network, the effective ohmic resistance of the network varying, upon adjustment of the potentiometers, in correspondence with the non-linear voltage-temperature characteristic of the thermocouple over a predetermined temperature range.

The above-stated and other objects and advantages of the invention will become apparent from the following description when taken in conjunction with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views.

Figure 1:
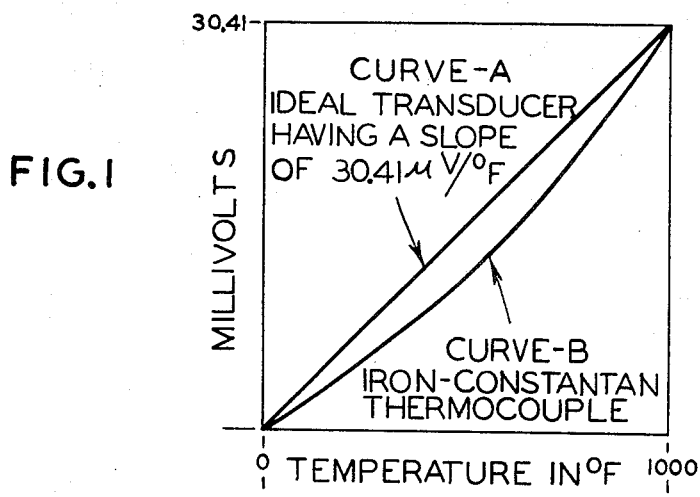
FIGURE 1 is a graph showing the response characteristics of an iron-constantan thermocouple and an ideal transducer over a temperature range of 0–1000° F.

Reference now is made to FIGURE 1 wherein the curve A is a straight line representing the linear response of an ideal temperature to voltage transducer over a temperature range of 0–1000°. As shown, this curve has a slope of 30.41 microvolts/degree F. The curve B represents the non-linear response of an iron-constantan thermocouple identified as a "J" thermocouple in standard thermometric tables. Although a "J" thermocouple is here used for purposes of discussion, it will be apparent that the following approach is valid for other thermocouples.

As obtained from the standard thermometric tables, the J thermocouple generates −0.89 millivolt at a temperature of 0° F., and +29.52 mv. at 1000° F. when the cold junction is 32° F. When these voltages are added algebraically for the full span of 0–1000° F. we obtain, $$29.52 - (-0.89) = 30.41 \text{ millivolts}$$

or $$\frac{30.41 \times 1000}{1000} = 30.41 \text{ microvolts/°F.} \quad (1)$$

which is the average slope a J thermocouple between 0–1000° F.

Figure 2:
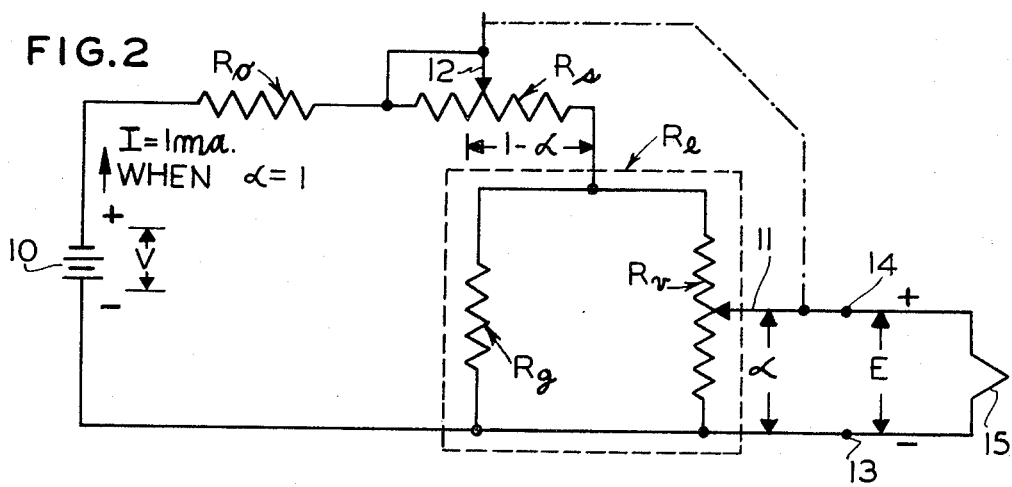
FIGURE 2 is a circuit diagram for reference in the development of the technique for providing a resistance network, the effective resistance of which varies in correspondence with the non-linear response of the thermocouple.

Reference now is made to FIGURE 2, wherein there is shown a resistance network connected to a battery 10 having a voltage represented by (V), said network consisting of two fixed resistors $R_o$ and $R_g$ and two potentiometers $R_s$ and $R_v$, which potentiometers have their shafts coupled together for simultaneous movement of the respective sliders 12 and 11. The thermocouple 15 is connected to the network terminals 13 and 14 and the voltage generated by the thermocouple is represented by (E). The character ($\alpha$) represents the momentary position of the sliders, taken with reference to the zero resistance end of the potentiometers and the term (1−α) is complementary thereto. Although the two sliders move simultaneously, they are so connected, electrically, that as the resistance of the potentiometer $R_v$ increases, the resistance of the potentiometer $R_s$ decreases.

As stated, above, one of the end points of the temperature range is 1000° F., at which point the thermocouple generates 30.41 mv. The ohmic values of the fixed resistors and potentiometers can be selected so that the resistance of the network across the battery will result in a current flow of 1 milliampere when α=1, that is, when the slider of each potentiometer is at an end position. Under these conditions, the ohmic value of potentiometer $R_v$ is such that the potential drop between the potentiometer slider 11 and the network terminal 13 is 30.41 mv. Assuming a pointer is secured to the potentiometer shaft and such pointer is rotatable relative to a calibrated scale of temperature values, the pointer will be aligned with the 1000° F. line of the scale, under the stated condition.

The ohmic value of the fixed resistors remains constant so that $R_s$ and $R_v$ are the only elements which vary upon variation of (α), assuming the battery has a zero impedance. The ohmic variation of $R_v$ alone will follow a straight line, similar to that of the ideal transducer, if the value of $R_s$ remains constant. However, as (α) increases, the value of $R_s$ correspondingly decreases, thereby causing an increase in the current I flowing in the network. Such incremental change in $R_s$ changes the potential drop across the parallel circuit comprising the resistor $R_g$ and the potentiometer $R_v$, such circuit being designated by $R_e$.

The following assumptions are now made;

$(\alpha) \times (R_v) = 0$ mv., when $\alpha = 0$
$(\alpha) \times (R_v) = 14.2$ mv., when $\alpha = \frac{1}{2}$
$(\alpha) \times (R_v) = 29.52$ mv., when $\alpha = 1$ The above values are obtained from the standard table for a J thermocouple at 32° F. reference temperature.

In order to establish a reference point at 0° F., −.89 mv. is added, algebraically, to the values obtained from the standard table, so that, $(\alpha) \times (R_e) = 0$ mv., when $\alpha = 0$
$(\alpha) \times (R_e) = 15.01$ mv., when $\alpha = \frac{1}{2}$
$(\alpha) \times (R_e) = 30.41$ mv., when $\alpha = 1.0$ The following current and voltage relationships will be apparent from FIGURE 2.

$$I(\alpha) = \frac{V \times 1000}{R_o + (1-\alpha)R_s + R_e} = \text{ma.} \quad (2)$$

$$E(\alpha) = \frac{V \times 1000 \times R_e \times \alpha}{R_o + (1-\alpha)R_s + R_e} = \text{mv.} \quad (3)$$

where;

$I(\alpha)$ = network current as a function of $\alpha$
$E(\alpha)$ = the voltage across the network terminals 13, 14, as a function of $\alpha$, and $$R_e = \frac{R_g \times R_v}{R_g + R_v}$$

Then, when $\alpha = 1$, $E(\alpha)$ becomes, $$E(1) = \frac{1000V \times R_e}{R_o + R_e} = 30.41 \text{ mv.} \quad (4)$$

and when $\alpha = \frac{1}{2}$, $E(\alpha)$ becomes, $$E(1/2) = \frac{1000V \times \frac{R_e}{2}}{R_o + \frac{R_s}{2} + R_e} = 15.01 \text{ mv.} \quad (5)$$

If it now be assumed that $I = 1.0$ ma. when $(\alpha) = 1$, then Equation 2 becomes, $$1.0 = \frac{V \times 1000}{R_o + 30.41} \quad (6)$$

or $$R_o = 1000V - 30.41 \quad (7)$$

and when $(\alpha) = \frac{1}{2}$, Equation 5 becomes $$15.01 = \frac{1000V \frac{R_e}{2}}{R_o = 30.41 + \frac{R_s}{2}} \quad (8)$$

Substituting Equation 7 in Equation 8, $$15.01 = \frac{1000V \times \frac{R_e}{2}}{1000V + \frac{R_s}{2}} \quad (9)$$

$R_g$ is found from the relationship, $$R_e = \frac{R_v \times R_g}{R_v + R_g} = 30.41 \quad (10)$$

$$R_v \times 30.41 + 30.41 R_g = R_v \times R_g \quad (11)$$

$$R_g = \frac{R_v \times 30.41}{R_v - 30.41} \quad (12)$$

Given $R_s$ and $R_v$, the values of V and $R_o$ can be determined from simultaneous solutions of Equations 7 and 9. $R_g$ can be determined from Equation 12.

Assuming $R_s$ and $R_v$ each are 100 ohms, the values in Table No. 1, below, are obtained from Equation 3, that is, $$E(\alpha) = \frac{V \times 1000 \times \alpha \times 30.41}{V \times 1000 + (1-\alpha)R_s} \quad (13)$$

In Table No. 1, there are shown,

Column (1)—temperature values in steps of 100° F.,
Column (2)—position (α) of the potentiometer sliders,
Column (3)—the voltage of a "J" thermocouple obtained from the standard table in mv.,
Column (4)—the values of E(α) obtained from Equation 3, in mv.,
Column (5)—the error, in mv., between columns (3) and (4), and
Column (6)—the corresponding error in temperature, degree F.

TABLE 1

| (1) ° F. | (2) (α) | (3) J Couple | (4) E(α) | (5) Error MV | (6) Error, ° F. |
|---|---|---|---|---|---|
| 0 | .0 | 0 | 0 | 0 | 0 |
| 100 | .1 | 2.83 | 2.971 | −.141 | 4.7 |
| 200 | .2 | 5.80 | 5.958 | −.158 | 5.2 |
| 300 | .3 | 8.830 | 8.960 | −.130 | 4.3 |
| 400 | .4 | 11.920 | 11.977 | −.057 | 1.9 |
| 500 | .5 | 15.01 | 15.01 | 0 | 0 |
| 600 | .6 | 18.070 | 18.908 | +.012 | .3 |
| 700 | .7 | 21.150 | 21.122 | +.028 | .8 |
| 800 | .8 | 24.210 | 24.202 | +.008 | .3 |
| 900 | .9 | 27.290 | 27.298 | −.008 | .3 |
| 1,000 | 1.0 | 30.41 | 30.41 | 0 | 0 |

From the above table it will be noted that an accuracy of $$\frac{.158 + .028}{2(30.410)} \times 100 = \pm .3\%$$

of full span, or 3° F., is realized.

Figure 3:
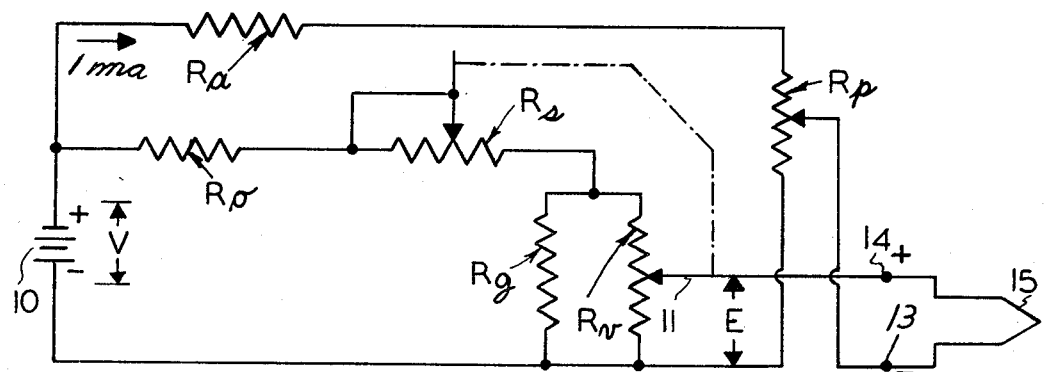
FIGURE 3 is similar to FIGURE 2 and showing an additional potentiometer inserted into the circuit to compensate for the negative voltage developed by an iron-constantan thermocouple at 0° F. when the cold junction is at 75° F.

As stated above, the potential developed by a J thermocouple at 0° F., taken with reference to 32° F., is −0.89 mv. This fact must be taken into consideration in the development of the network. Reference now is made to FIGURE 3 which is similar to FIGURE 2 except for the added fixed resistor $R_a$ and the potentiometer $R_p$ which form a branch circuit in parallel with the main network already described. The value of the potentiometer $R_p$ is selected to be about 1.5 ohms and the total resistance of the branch circuit is such that the magnitude of the current flowing therein is equal to that flowing in the main network, namely, 1.0 ma. The potentiometer is adjusted so that its output voltage is 0.89 mv., which voltage is applied across the network input terminals 13 and 14.

Figure 4:
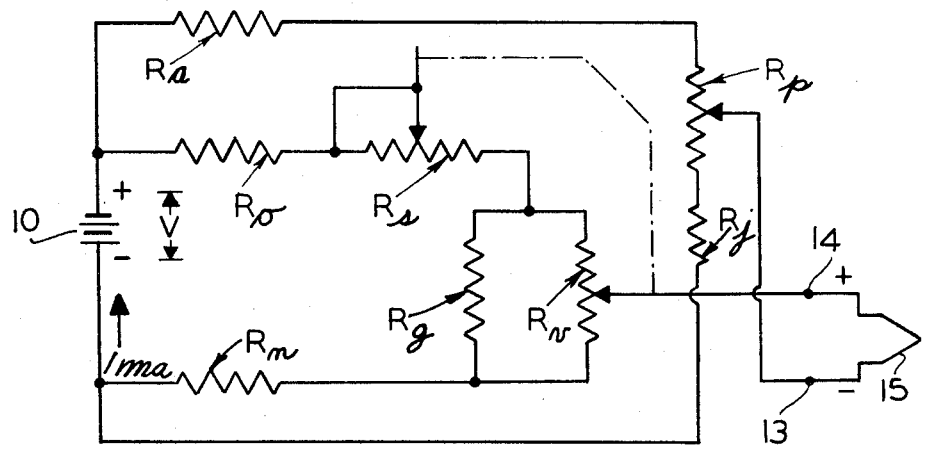
FIGURE 4 is similar to FIGURE 3 and including ambient temperature compensating resistors.

When the temperature is measured by a thermocouple connected directly to the network terminals, such terminals constitute the reference junction of the thermocouple. In such case, cold junction compensation is required. Referring to FIGURE 4, cold junction compensation is obtained by means of a register $R_j$, connected as shown and which changes in resistance in proportion to cold junction temperature variations. Such resistor is connected in series with the branch circuit comprising the resistor $R_a$ and potentiometer $R_p$. In order to maintain a null condition, at the reference junction temperature, a resistor $R_n$ is connected in series with the main network, the ohmic value of $R_n$ being determined from the equation, $$R_n = R_j + EMF_1 \qquad (14)$$

where $EMF_1 =$ mv. corresponding to the lower end of the temperature scale.

Figure 5:
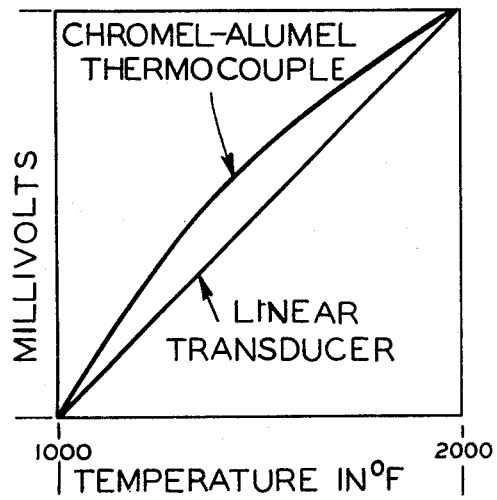
FIGURE 5 is a graph showing the non-linear response characteristic of a chromel-alumel thermocouple.

The described approach for developing a linearized thermocouple measuring network over a predetermined range of temperature values also is applicable to cases wherein the non-linear curve of the thermocouple is displaced above the straight line as, for example, a Cromel-Alumel thermocouple between 1000–2000° F., as shown in FIGURE 5. In this case, and with reference to FIGURE 2, the electrical connection between the two potentiometers are reversed, so that the resistance of both potentiometers varies in the same direction upon rotation of the common shaft. Specifically, as $\alpha$ increases, the ohmic value of the potentiometer $R_s$ increases, thereby decreasing the magnitude of the current flowing through the parallel circuit consisting of $R_v$ and $R_g$ and changing the slope of the curve representing the voltage (E) appearing across the network terminals 13 and 14.

Figure 6:
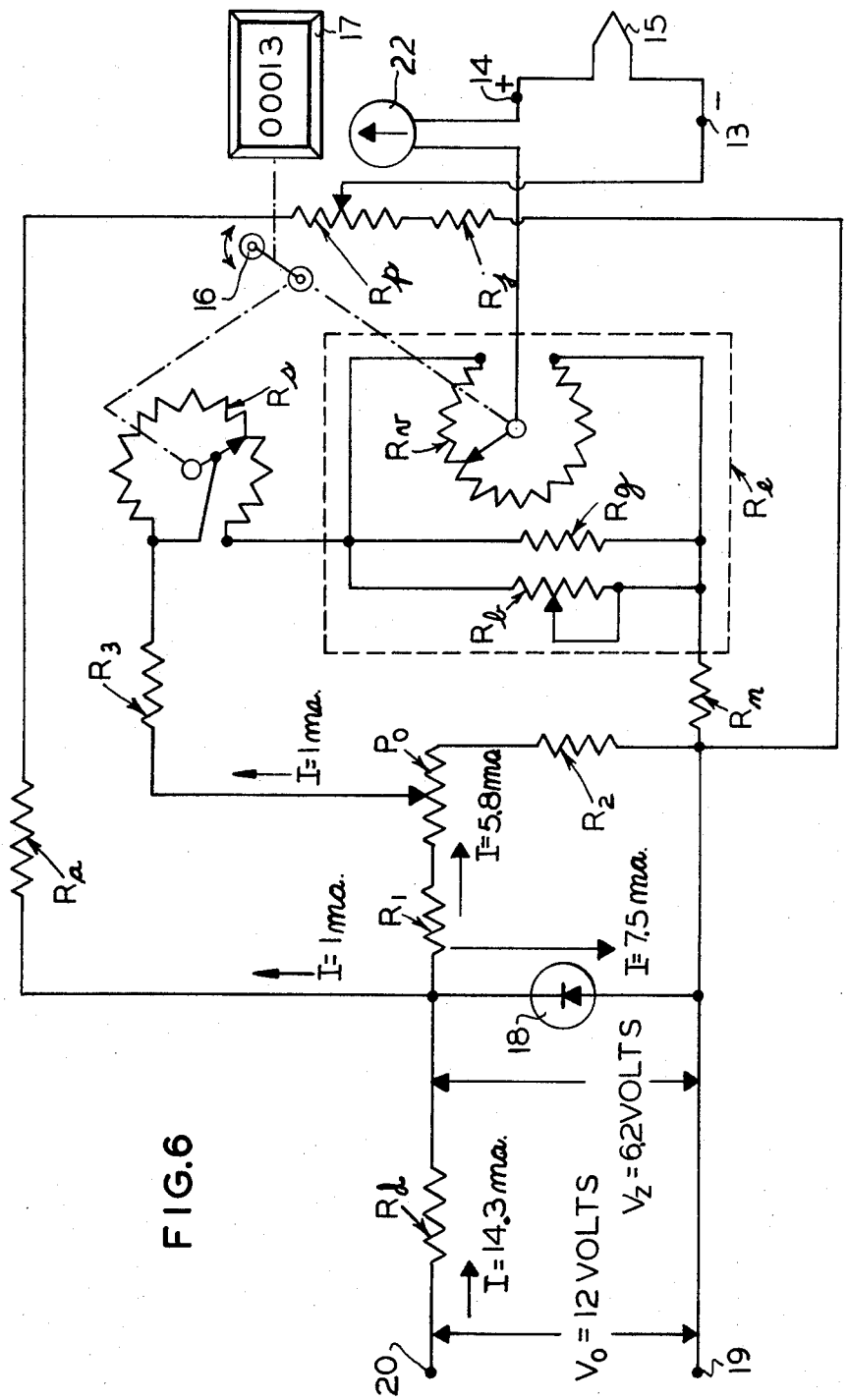
FIGURE 6 is a circuit diagram of a complete measuring circuit made in accordance with this invention.

A complete, linearized thermocouple measuring circuit is shown in FIGURE 6 to which reference now is made. The potentiometers $R_v$ and $R_s$ each have windings distributed uniformly over an angular extent of 3600 degrees and their sliders are coupled together for simultaneous rotation by a knob 16, which knob is mechanically coupled to a counter 17 providing a visual indication of temperature values. In the case of a thermocouple having a non-linear voltage vs. temperature curve falling below a straight line over the selected temperature range, these potentiometers rotate in opposite directions, the resistance of $R_s$ increasing as the resistance of $R_v$ is decreasing. In the case of a thermocouple having a voltage vs. temperature curve falling above a straight line over the selected temperature range, the potentiometers are coupled for rotation in the same directions, that is, the resistance of both changes in the same direction upon rotation of the knob 16. Standard potentiometers of this type are available with a temperature coefficient of 20 parts per million, an adjusted resistance of ±1% of given ohmic value and a slider rotation of ten full turns.

For various thermocouples and temperature ranges, the values of $R_o$, V and $R_g$ (FIGURE 2) can be determined from the following relationships, $$R_e = EMF_E - EMF_1 \qquad (15)$$
$$P = EMF_M - EMF_I \qquad (16)$$

where, $EMF_E =$ voltage at the upper end of the temperature range, in mv.,
$EMF_I =$ the voltage at the lower end of the temperature range, in mv.,
$EMF_M =$ the voltage at the middle of the temperature range, in mv., and
$R_e =$ the resistance of the parallel network consisting of $R_g$ and $R_v$ Substitution of Equation 16 in Equation 13, $$P = \frac{1000V \frac{R_e}{2}}{1000V + \frac{R_s}{2}}$$

then $$V = \frac{P \times R_s}{R_e - 2P} \text{ in mv.} \qquad (17)$$

The value of the resistor $R_n$ is found from the relationship, $$R_n = R_j + EMF_I \qquad (18)$$

and the value of the fixed resistor $R_o$ is found from the relationship, $$R_o = V - R_e - R_n \qquad (19)$$

The fixed resistor $R_o$ shown in FIGURE 2 is replaced in the FIGURE 6 circuit by the fixed resistor $R_1$, a potentiometer $P_o$ and a fixed resistor $R_3$. FIGURE 6 includes a balancing galvonmeter 22 and, also a fixed resistor $R_2$ has been added to form a voltage divider across the Zener diode 18. In the above discussion, it was assumed that the voltage source has a zero impedance. This is not the case in practice. However, by making the fixed resistors $R_1$ and $R_2$ of low values and the resistor $R_3$ of a high value, varying the potentiometer $P_o$ from minimum to maximum values results only in a very small change in the impedance of the network connected across the Zener diode 18. Thus, for practical purposes a power supply connected across the network terminals 19 and 20 can be considered as having a constant impedance. The resistor $R_d$ is determined from the equation, $$R_d = \frac{V_o - 6.2}{14.3} \times 1000 \text{ ohms} \qquad (20)$$

where
$V_o =$ available DC supply voltage,
6.2 = the voltage across the diode, and
14.3 = current flowing the resistor $R_d$, in ma.

It is here pointed out that the value $R_e$, as used in the formulae discussed hereinabove, is the total resistance of the potentiometer $R_v$ and the shunting resistor $R_g$, see FIGURE 2. In FIGURE 6, the potentiometer $R_v$ is shunted by the fixed resistor $R_g$ and a potentiometer $R_b$, the resistor having a value of 100 ohms±1% and the potentiometer having a value of 200 ohms. The diode 18 is a type 1N825 having a resistance of 15 ohms and the voltage $V_z$, across the diode, is 6.2 volts. The potentiometer $P_o$ has a resistance of 200 ohms. All of these values remain fixed for all ranges of the circuit.

The value of the voltage-dropping resistor $R_d$ is obtained from the relationship, $$R_d = \frac{V_o - V_z}{14.3 \text{ ma.}} \times 100 \text{ in ohms} \qquad (21)$$

Having determined the values of V and $R_o$ from Equations 17 and 19, it remains now only to determine the values of the range-changing resistors $R_1$, $R_2$ and $R_3$. In order to express $R_2$ in terms of known voltages, the voltage division formula is used, $$V = \frac{R_2 + \frac{P_o}{2}}{R_1 + R_2 + P_o + R_z} \times 6200 \qquad (22)$$

It is assumed that $R_1 + R_2 + R_z$ total to 1000 ohms, whereby Equation 22 becomes, $$V = \frac{R_2 + 100}{1000 + 200} \times 6200 \qquad (23)$$

and $$R_2 = \frac{12V - 620}{6.2}$$
$$= 1.935V - 100, \text{ in ohms} \qquad (24)$$

then, $$R_1 = 1000 - R_2 - 15$$
$$= 985 - R_2, \text{ in ohms} \quad (25)$$

and $$R_3 = R_o - \frac{\left(R_1 + \frac{P_o}{2} + R_2\right)\left(R_2 + \frac{P_o}{2}\right)}{R_1 + R_2 + R_z + P_o}$$

$$= R_o - \frac{(R_1 + 115)(R_2 + 100)}{1200} \quad (26)$$

in ohms

The steps for determining the values of the components forming the digital temperature measuring circuit, shown in FIGURE 6, will now be summarized. The values of the following components are known and remain constant for all ranges of the circuit.

| Component: | Resistance in ohms |
|---|---|
| Measuring potentiometer $R_v$ | 100 |
| Shunting resistor $R_g$ | 100 |
| Shunting potentiometer $R_b$ | 200 |
| Measuring potentiometer $R_s$ | 100 |
| Fixed resistor $R_a$ | 6,185 |
| Potentiometer $P_o$ | 200 |
| Potentiometer $R_p$ | 1.5 |

Assuming a temperature measuring range of 0–1000° F., the voltages generated by the particular thermocouple at three temperature points are obtained from the standard thermometric tables. Specifically, $EMF_E$ = millivolts at 1000°F.
$EMF_I$ = millivolts at 0°F.   } taken at any cold junction reference temperature.
$EMF_M$ = millivolts at 500°F.
$P = EMF_M - EMF_I$ The unknown values V, $R_o$ and $R_n$ are determined as follows:

Step I: find $R_e$ from Equation 16, $$R_e = EMF_E - EMF_I' \text{ in ohms}$$

Step II; find V from Equation 17, $$V = \frac{P \times 50}{\frac{R_e}{2} - P}$$

in millivolts.

Step III: the ohmic value of the temperature compensating resistor $R_j$ is obtained from the Standard table Step IV: find $R_n$ from Equation 18, $$R_n = R_j + EMF_I$$

in ohms. Step V: find $R_o$ from Equation 19, $$R_o = V - R_e - R_n$$

Step VI: let $V_o$ designate the input voltage
Step VII: find $R_d$ from Equation 20, $$R_d = \frac{V_o - 6.2}{14.3}$$

in ohms. Step VIII: find $R_2$ from Equation 24, $$R_2 = 1.935V - 100$$

in ohms. Step IX: find $R_1$ from Equation 25, $$R_1 = 985 - R_2$$

in ohms. Step X: finds $R_3$ from Equation 26, $$R_3 = R_o - \frac{(R_1 + 115)(R_2 + 100)}{1200}$$

Preferably the range-changing resistors $R_1$, $R_2$ and $R_3$ are mounted on a range card arranged for plug connection into the circuit, thereby to facilitate changing the measuring range of the apparatus.

The invention has been described with specific reference to a measuring system having a thermocouple as the transducer. However, it will be apparent that the linearly-adjustable, potentiometric network is adapted for use with any transducer providing a non-linear output voltage in response to changes in a condition over a range defined by two points of reference, and which output voltage falls substantially on a parabolic curve having its points of origin at such points of reference.

Having now described the invention, those skilled in this art will be able to make various changes and modifications without thereby departing from the spirit and scope of the invention as recited in the following claims.

I claim:

1. A potentiometric circuit having two input terminals for connection to a transducer providing a non-linear D.C. voltage output in response to changes in a variable factor, said circuit comprising,
    (a) a constant D.C. voltage source,
    (b) a first potentiometer having a uniformly distributed resistance winding, said potentiometer having a slider in contact with said winding and connected to one input terminal,
    (c) a first resistor connected across the winding of the first potentiometer to form a parallel network, one end of the network being connected to one side of said voltage source and to the other input terminal,
    (d) a second potentiometer having a slider in contact with a uniformly distributed resistance winding, one end of said winding being connected to the other end of said parallel network and the other end of the winding being connected to the said slider,
    (e) a second resistor connected in series between the other side of the voltage source and the slider of the said second potentiometer,
    (f) coupling means coupling together the sliders of the two potentiometers for simultaneous and equal movement thereof,
    (g) visual read-out means calibrated linearly in values of said variable factor and responsive to simultaneous movement of the potentiometer sliders, and
    (h) an electrical null indicator connected in series with said transducer.

2. The invention as recited in claim 1, wherein the said read-out means is a counter mechanically-coupled to the said coupling means.

3. The invention as recited in claim 1, including a third fixed resistor connected to the said other side of the voltage source; and a third potentiometer having a slider connected to the said other input terminal and a winding connected between the said one side of the voltage source and the said third resistor.

4. The invention as recited in claim 3, including a temperature compensating resistor connected in series with the winding of the third potentiometer.

5. The invention as recited in claim 1, wherein the simultaneous movement of the two sliders results in an increase in the effective resistance of said second potentiometer and a corresponding decrease in the resistance of the said first potentiometer as measured across the said two input terminals.

6. The invention as recited in claim 1, wherein the simultaneous movement of the two sliders results in an increase in the effective resistance of the said first potentiometer and a corresponding increase in the resistance of the second potentiometer as measured across the said input terminals.

7. Temperature measuring apparatus comprising,
    (a) a constant D.C. voltage source,
    (b) a first potentiometer having a uniformly distributed resistance winding and a rotatable slider which is connected to a first input terminal,
    (c) a first resistor connected across the winding of the first potentiometer to form a parallel circuit, one end of such circuit being connected to one side of the said voltage source and to a second input terminal, (d) a second potentiometer having a rotatable slider connected to one end of a uniformly distributed resistance winding, the other end of the winding being connected to the other end of the said parallel circuit, (e) a second resistor connected in series between the other side of said voltage source and to the slider of said second potentiometer, (f) coupling means coupling together the sliders of said first and second potentiometers for simultaneous and equal rotation thereof, (g) a shaft connected to the said coupling means, (h) read-out means calibrated linearly in temperature values and mechanically coupled to the said shaft, (i) a thermocouple connected across the said first and second input terminals, and (j) an electrical null indicator connected in series with said thermocouple.

8. The invention as recited in claim 7, including a third potentiometer having a winding connected to a third resistor, said winding and third resistor being connected in series across the said voltage source, said potentiometer having a slider connected to the said second input terminal; and a fourth resistor connected between the said one end of said parallel network and the said one side of the voltage source.

9. The invention as recited in claim 8, including a temperature-compensating resistor connected in series with the winding of the said third potentiometer.

References Cited

UNITED STATES PATENTS

| | | | |
|---|---|---|---|
| 1,132,591 | 3/1915 | Leeds | 73—360 |
| 2,739,271 | 3/1956 | Umrath et al. | 73—360 XR |
| 2,745,285 | 5/1956 | Wannamaker | 73—360 |
| 3,339,414 | 9/1967 | Coor. | |

LOUIS R. PRINCE, Primary Examiner

FREDERICK SHOON, Assistant Examiner